United States Patent
Sivaraman (10) Patent No.: US 11,847,687 B2
(45) Date of Patent: Dec. 19, 2023

(54) WISH LIST TRANSACTIONS THROUGH INTELLIGENT MULTI-COMPONENT DEVICES

(71) Applicant: PAYPAL, INC., San Jose, CA (US)

(72) Inventor: Sridhar Sivaraman, Chennai (IN)

(73) Assignee: PAYPAL, INC., San Jose, CA (US)

( * ) Notice: Subject to any disclaimer, the term of this patent is extended or adjusted under 35 U.S.C. 154(b) by 83 days.

(21) Appl. No.: 17/165,907

(22) Filed: Feb. 2, 2021

(65) Prior Publication Data
US 2021/0166291 A1    Jun. 3, 2021

Related U.S. Application Data

(63) Continuation of application No. 15/485,055, filed on Apr. 11, 2017, now Pat. No. 10,909,609, which is a continuation of application No. 13/592,854, filed on Aug. 23, 2012, now Pat. No. 9,619,833.

(60) Provisional application No. 61/655,354, filed on Jun. 4, 2012.

(51) Int. Cl.
| | |
|---|---|
| *G06Q 30/0601* | (2023.01) |
| *H04N 21/258* | (2011.01) |
| *H04N 21/488* | (2011.01) |
| *H04N 21/254* | (2011.01) |
| *H04N 21/478* | (2011.01) |

(52) U.S. Cl.
CPC ..... *G06Q 30/0633* (2013.01); *G06Q 30/0635* (2013.01); *G06Q 30/0641* (2013.01); *H04N 21/25891* (2013.01); *H04N 21/4882* (2013.01); *H04N 21/2542* (2013.01); *H04N 21/47815* (2013.01)

(58) Field of Classification Search
CPC .......... G06Q 30/0633; G06Q 30/0635; G06Q 30/0641
See application file for complete search history.

(56) References Cited

U.S. PATENT DOCUMENTS

| | | | |
|---|---|---|---|
| 7,356,490 B1* | 4/2008 | Jacobi | G06Q 30/0631 705/26.8 |
| 8,346,626 B2 | 1/2013 | Robertson | |
| 8,560,401 B1* | 10/2013 | Bharara | G06Q 30/00 705/26.81 |
| 9,519,932 B2* | 12/2016 | Calman | G06Q 40/02 |
| 2007/0095903 A1* | 5/2007 | Suenbuel | G06Q 30/02 235/383 |
| 2008/0288600 A1 | 11/2008 | Clark | |

(Continued)

OTHER PUBLICATIONS

Kucera, Danielle, "See it on TV, get it on eBay; Firm developing an application that identifies, buys products used by characters in TV shows", The Vancouver Sun, Nov. 22, 2011, 4 pages, Informart, a division of Postmedia Network Inc., ProQuest LLC., Ann Arbor, MI.

*Primary Examiner* — Michael Misiaszek
(74) *Attorney, Agent, or Firm* — Haynes and Boone, LLP (57) ABSTRACT

A user may create a wish/gift list and send the list to recipients, who have the option of accepting the list. Content being viewed or recorded by recipients who have accepted the list is scanned to determine whether the content is relevant to one or more items on the list. If so, an alert is displayed on a recipient device, which can be the same device as the displayed content. The recipient may select the alert to purchase the item(s) or obtain additional information about the item(s) for a subsequent purchase.

20 Claims, 4 Drawing Sheets

(56) References Cited

U.S. PATENT DOCUMENTS

| | | |
|---|---|---|
| 2009/0171950 A1 | 7/2009 | Lunenfeld |
| 2011/0191181 A1* | 8/2011 | Blackhurst ......... G06Q 30/0255 |
| | | 705/14.66 |
| 2012/0233072 A1* | 9/2012 | Calman ................. G06Q 40/02 |
| | | 705/44 |
| 2013/0006803 A1* | 1/2013 | Oskolkov .............. G06Q 30/06 |
| | | 705/26.8 |
| 2013/0014136 A1 | 1/2013 | Bhatia et al. |
| 2013/0085924 A1 | 4/2013 | Colak et al. |
| 2013/0110662 A1 | 5/2013 | Dezelak et al. |
| 2020/0275162 A1* | 8/2020 | Schmidt ............. H04N 21/4828 |

* cited by examiner

FIG. 4

WISH LIST TRANSACTIONS THROUGH INTELLIGENT MULTI-COMPONENT DEVICES

CROSS REFERENCE TO RELATED APPLICATION

This application is a continuation of U.S. patent application Ser. No. 15/485,055, filed Apr. 11, 2017, issued on Feb. 2, 2021 as U.S. Pat. No. 10,909,609 and is a continuation of U.S. patent application Ser. No. 13/592,854, filed Aug. 23, 2012, and issued as U.S. Pat. No. 9,619,833 on Apr. 11, 2017, which claims the benefit of U.S. Provisional Patent Application Ser. No. 61/655,354, filed Jun. 4, 2012, which is incorporated by reference in their entirety.

BACKGROUND

Technical Field

The present application generally relates to electronic commerce, and in particular, to commerce through a smart television.

Related Art

Currently, there are many ways to share a wish list with others, such as through email, mobile devices, social networks, and Internet sites. Wish lists allow a user to show others items the user may wish to receive or obtain. Receivers of wish lists may include friends, business associates, relatives, and the like who may desire to make a purchase of an item on the wish list to give to the user.

Because a main purpose of a wish list is to be able to share with others and possibly receive an item from the wish list from a wish list recipient, it would be desirable to provide recipients with an easy, convenient, and fun way to receive and purchase from a wish list.

BRIEF DESCRIPTION OF THE DRAWINGS

Wherever possible, the same reference numbers are used throughout the drawings to refer to the same or like elements.

DETAILED DESCRIPTION

According to one embodiment, a user shares a wish list through a smart television, such as a smart direct to home (DTH) TV utilizing a smart card. The wish list may be created through a service provider site, such as PayPal or eBay, by adding one or more items to the wish list. The user can identify one or more recipients of the wish list by specifying desired recipient's smart card numbers or other identifiers. The identified recipients then receive an onscreen alert on their smart TV, such as an icon on the screen. The alert may notify the recipient that a wish list has been sent from the user and requests whether the recipient wants to accept the list. If yes, the recipient can accept through the smart TV or other means.

Once accepted, items on the wish list are compared with program contact being viewed by the recipient on the smart TV. When content appears that is related to an item from the wish list, an alert or notification may be communicated to the recipient, such as on the smart TV display. For example, an item on the wish list may be a WWE John Cena shirt. The recipient turns on a WWE wrestling program and sees an alert pop on the screen.

Upon seeing the alert or notification, the recipient can select the alert to initiate a purchase of the wish list item. For example, the recipient can select the alert through a remote control, pointing device, or through a touch on the screen. The user may be directed to a screen, such as on the TV or a user computing device, such as a smart phone or PC, that includes information about the item. The screen may be a product or checkout screen from a merchant or service provider. The recipient may then make the purchase through a typical checkout flow or process or other method.

Upon payment approval, the recipient and user may both be notified of the purchase. The item may then be shipped or delivered to the user.

As a result, the user may share a wish list through a TV and recipients may be alerted when they are watching a program related to an item on the wish list, which may prompt a recipient to make the gift purchase for the user.

These and other embodiments will be described in further detail below, with reference to the following drawings.

Figure 1:
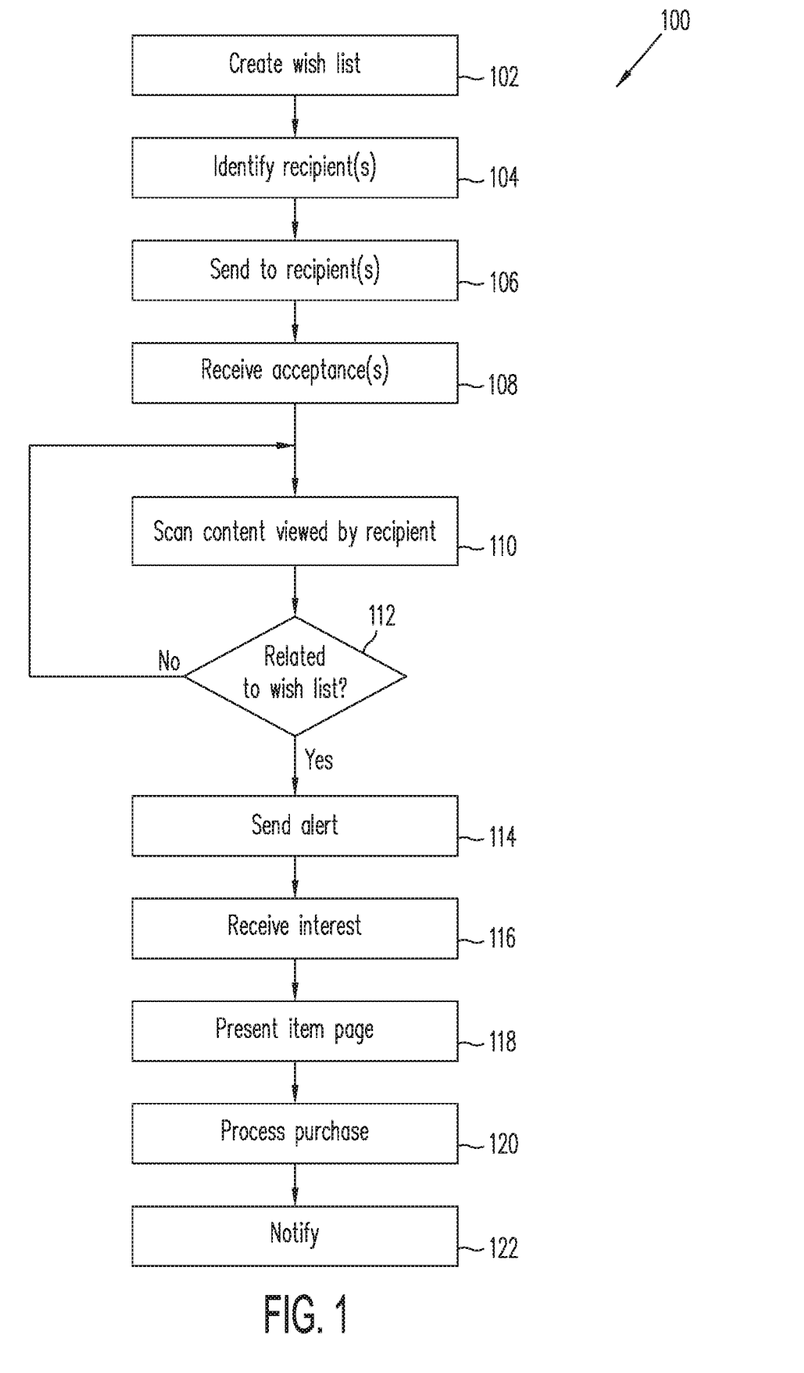
FIG. 1 is a flowchart illustrating a method for conducting a wish list transaction through an interactive content display device according to one embodiment.

FIG. 1 is a flowchart showing a process 100 for conducting a wish list transaction through an interactive content display device according to one embodiment. At step 102, a user creates a wish list, such as with a service provider like PayPal, Inc. or eBay Inc. The user may access or log onto a user account with the service provider through a computing device, such as a PC, smart phone, or computing tablet. The user may add items to the wish list through known methods, such as searching for and selecting a desired item by clicking on a button to add the desired item to the wish list. The wish list may then contain a list of selected items, such as by description, along with links to purchase the items if desired. The wish list may be created in other ways as well, through various methods known in the industry. For example, the user may download a gift list created from another application, program, or site, the user may be presented with gift suggestions from a service provider, which can be used to start or add onto a list, and/or the user may scan or otherwise capture item information from a user device, such as a smart phone, to add the item to a wish list.

Next, at step 104, the user may identify recipient(s) of the user wish list. In one embodiment, the user enters or otherwise selects, such as from a contact list, smart card numbers for a recipient television, such as a DTH TV. In other embodiments, the user can select a recipient phone number, user ID, email address, or other recipient/device identifier. For example, the user may select recipients from a drop down menu with names or photos and corresponding contact information. The user may also manually enter a recipient identifier if one is not readily available from a stored list. The recipient and/or device identifier can then be used to identify the recipient directly or indirectly.

An alert or other notification can be sent to the identified recipients at step 106, such as through the corresponding recipient devices like a DTH TV, smart phone, PC, or computing tablet. The notification may be an icon informing the recipient that the user has sent a wish list to the recipient and asks the recipient whether the recipient desires to accept the wish list. Other types and means of notification may also be suitable, such as a text message, email, voice message, or visual indicator to one or more recipient devices.

If the recipient decides to accept the wish list, the acceptance is received by the service provider at step 108. For example, after viewing the alert or notification, the recipient may select the alert or a portion of the alert, such as with a touch or remote controller, through the TV or other recipient device. The information is communicated electronically to the service provider from the device. The recipient may accept the wish list through any suitable means. Examples include selecting an "accept" or similar link or button from a user smart phone, computing tablet, television, PC, or other computing device. The recipient may also use voice or text to accept the wish list.

Once the acceptance is received, the service provider scans content, at step 110, viewed by recipients who have accepted the user's wish list. The content may be on a television, such as a program, show, movie, commercial, sports event, news, etc. The content may also be on other devices with displays, such as a PC, computing tablet, smart phone, etc. In addition to video, the content may be text or images, such as a news story on an Internet site or merchandise on a shopping site. The content may be scanned for key words, program description, and any other information associated with the content. Thus, the service provider should have access, either directly or indirectly, to what recipients are currently viewing or expects to view on one or more recipient devices. In the latter case, the recipient may have set a program to be recorded. Thus, even if the recipient is not viewing the program live or in real-time, the service provider determine that a recorded program will be viewed at some time and that program contains content related to something on an accepted wish list.

While or after scanning content, a determination is made, at step 112, whether the currently viewed or recorded content is related to an item on the user's wish list. For example, if an item is a John Cena WWE t-shirt, and a recipient is watching a WWE show, a positive determination is obtained. Other item-related content examples include an online or television news story about John Cena or the WWE, electronic images of John Cena or the WWE, an online or television commercial or promotion about an upcoming WWE show, etc. The positive determination may be through a search of "John Cena" and/or "WWE".

If the currently viewed or recorded content is not related to any items on a user wish list, content may be continually monitored on one or more recipient viewing devices. When related content is found, an alert is sent, at step 114, to the recipient viewing the content. "Related" may be defined in various ways, depending on the service provider and the wish list item. For example, the service provider may not want to send alerts constantly for a certain "common" item, as that may be disruptive or annoying for the recipient. In that situation, "related" may be content that is very close to the wish list item. On the other hand, if an item is not "common" and a standard content search does not or would not yield many positive determinations, the service provider may broaden the meaning of "related" to produce more positive determinations. The content search can be dynamically changed if too many or too little positive determinations are found. For example, if a wish list item is a DVD of a specific movie, related content may include content involving an actor in the movie, the movie itself, a movie awards show, the director of the movie, a genre of the movie, etc. In another example, if the wish list item is a baseball, related content may include a sports show, a baseball game, ESPN Sports Center, etc.

The alert can be through the same device that the recipient is viewing the content on, such as a DTH TV. The alert may also be sent, in addition to or alternatively, to another recipient device, such as a smart phone, computing tablet, or PC. The alert essentially notifies the recipient that an item on a user's gift list can be purchased and is related to content the recipient is currently viewing.

Examples of alerts include an icon on a display, a text message, an audio message, an email, a link, etc. The alert may allow the recipient to select the alert to indicate an interest by the recipient of making a purchase of a specific item related to current content. Selection may include touching, tapping, or pointing and clicking the alert/icon or a portion thereof.

The interest is electronically received, at step 116, by the service provider. In response, the service provider presents information to the recipient, at step 118, such as on the recipient display device or computing device. The information may be a page providing information about the wish list item and details of how to purchase the item. The information may be presented as an overlay to the currently viewed content, on a new screen, on a portion of the currently viewed content, and/or on another recipient device, such as a smart phone, computing tablet, or PC.

For example, the information may include an item link or button, a payment link or button, item description, price, information about the user (or receiver of the purchase), etc. The information may be from a page or site hosted by the service provider or a merchant offering the item for purchase.

If the recipient decides to purchase the item for the user, the recipient can convey that information to the service provider, merchant, or other entity, such as through flows similar or the same as conventional payment processes. For example, the recipient may place the desired item in a cart, enter payment information, such as funding source and related information, a shipping option, any messages, and a confirmation of the purchase, such as through a click, tap, or other means of selection. The recipient may also log into an account with the service provider to streamline the payment flow.

The purchase may then be processed, at step 120, which may include crediting an account of the seller or merchant and debiting an account of the recipient (or buyer). Processing may also require authenticating the recipient if needed, such as by requesting a PIN or password from the recipient, including any identifying information, such as a user name.

After the purchase is processed, the recipient (buyer), the user (person receiving the purchase), and/or the seller or merchant may be notified, such as by the service provider. If the purchase is declined, the recipient and the merchant may be notified, such that the recipient may try another funding source or option. Notification may be via text, email, voice, or other means to one or more appropriate devices of the recipient, user, and/or seller.

If the purchase is approved, all three parties may be notified. The merchant may then deliver the purchased item to the user. The user or service provider may modify the user's wish list to remove the purchased item so that content is no longer scanned for relation to the particular item. Alternatively, or in addition, the service provider may notify other recipients of the user's wish list that the purchased item is no longer needed. Such a notification may be through recipient devices, as discussed above, such as through a DTH TV alert/icon or an audio/text notification on a recipient smart phone. Thus, recipients are kept updated as to items on a wish list no longer needed so that they do not purchase an unneeded item. Note that one or more of the above steps may be omitted, combined, and/or performed in a different sequence as desired and appropriate.

Embodiments as described herein may include and be performed by an internet-capable device that includes a memory and a processor, the processor executing instructions included in the memory for performing methods as described herein. Consistent with some embodiments, the internet-capable device may be a mobile device, such as a mobile phone, computing tablet, or smart phone running the iOS™ operating system, the Android™ operating system, Windows™ Mobile™ operating system, a BlackBerry™ operating system, or webOS™. Alternatively, the mobile device may be a tablet computer such as the Apple® iPad™ or the Samsung® Galaxy™ tablet. Consistent with some embodiments, the memory of the mobile device is capable of storing applications that, when executed by the processor, perform methods as described herein. In one embodiment, the mobile device may include any appropriate combination of hardware and/or software having a processor and capable of reading instructions stored on a non-transitory machine-readable medium for execution by the processor. Some common forms of machine-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. Applications stored in the memory or machine-readable media may be downloaded or purchased from application repositories such as the Apple® App Store™, Android™ MarketPlace™, or Amazon Appstore. Such instructions may allow the sharing of content from the mobile device to a second device The user device may also be a PC.

In one embodiment, televisions as described herein may be internet-capable televisions having a memory and a processor, wherein the memory is capable of storing applications or widgets that, when executed by the processor, perform methods as described herein. The internet-capable televisions have internet-capability via a connection to the internet through an internet appliance such as a DVR, an AppleTV™ device, a GoogleTV™ device, a console gaming system such as a Sony® PlayStation™ 3, a Microsoft® Xbox 360™, or other cable or satellite provider set-top box. Moreover, the internet appliance may also include a memory and a processor, wherein the memory is capable of storing applications or widgets that, when executed by the processor, perform methods as described herein.

Figure 2:
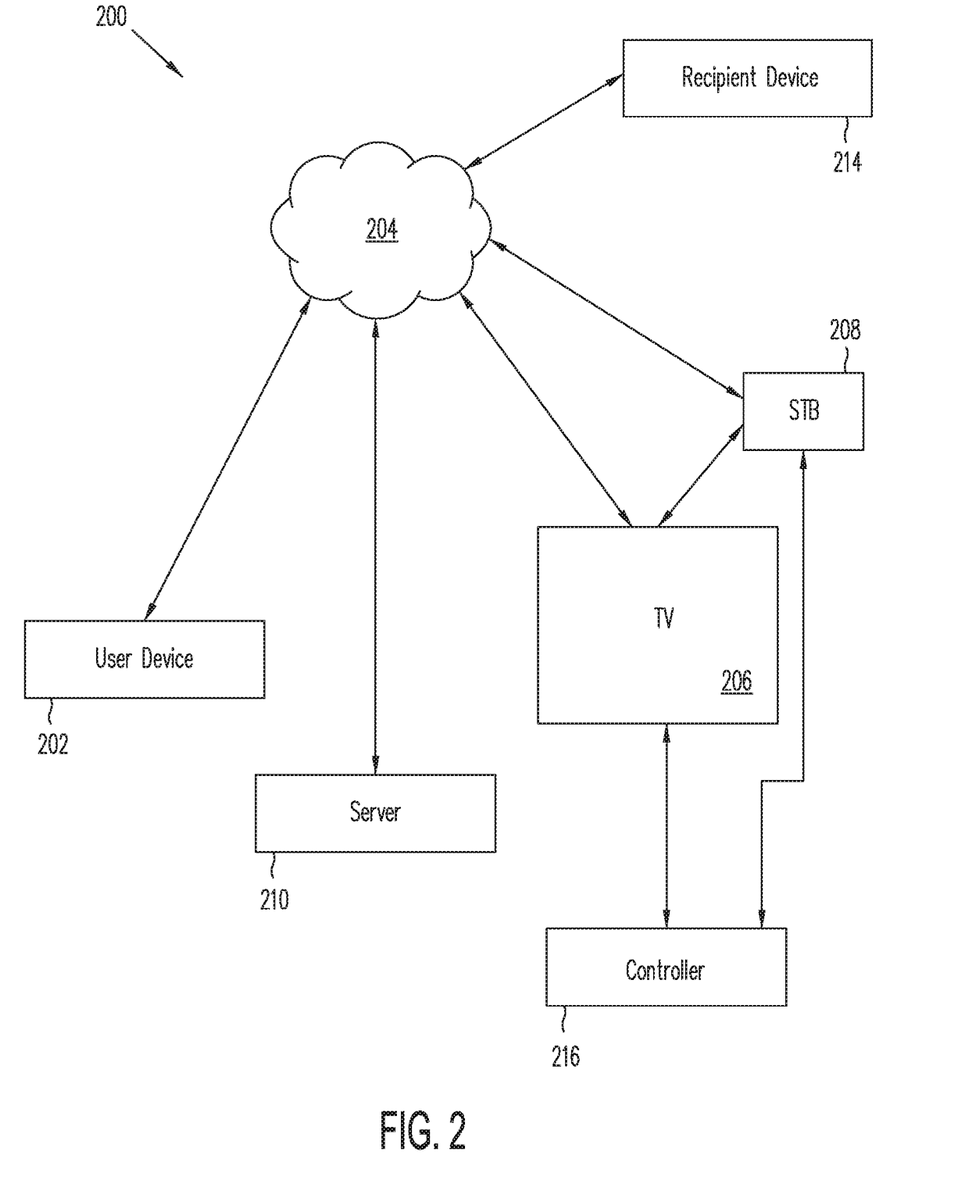
FIG. 2 is an illustration of a system used to conduct a wish list transaction according to one embodiment.

FIG. 2 is an illustration of a system 200 according to one embodiment used to perform the method in FIG. 1. As shown in FIG. 2, a first internet-capable user device 202 is coupled to a network 204. The connection may be wireless through a wireless data protocol such as Wi-Fi™, 3G, 4G, HDSPA, LTE, RF, NFC, or through a wired connection. As discussed above, first device 202 may be a mobile device such as an iPhone™ or iPad™ or other mobile device running the iOS™ operating system, the Android™ operating system, a BlackBerry™ operating system, or PalmOS™. First user device 202 may also be a personal computer, laptop computer, netbook, or tablet computer. Moreover, network 204 may be a local area or wide area network, or may simply referred to as "the cloud".

A second internet-capable user device 206 is also coupled to network 204. As with first user device 202, second user device 206 may also be coupled to network 204 wirelessly or through a wired connection. Second user device 206 may also include a memory and a processor, wherein the memory is capable of storing instructions such as applications or programs that, when executed by the processor, perform methods as described herein. In one embodiment, second user device 206 may be a internet-capable smart television, such as a DTH TV, or have may have internet-capability via a connection to the internet through an internet appliance 208, such as a DVR, an AppleTV™ device, a GoogleTV™ device or other satellite or cable provider set-top box. Moreover, internet appliance 208 may also include a memory and a processor, wherein the memory is capable of storing applications or programs that, when executed by the processor, perform methods as described herein. In one embodiment, the instructions stored in memory of second user device 206 and/or internet appliance 208 may provide a user interface for interacting with content displayed at second user device 206. The user interface may facilitate viewing content, receiving alerts while viewing content, and/or purchasing based on alerts.

System 200 further includes a remote server 210 also coupled to network 204. Remote server 210 may be coupled to internet through any wired or wireless connection. Moreover, remote server 210 may further include a memory and a processor, wherein the memory includes instructions for execution by the processor for performing methods as described herein. Such computer-readable instructions may be part of the instructions executed by remote server 210 to perform methods as described herein. In particular, remote server 210 may include instructions for facilitating communications between first user device 202 and second user device 206. Remote server 210 may support data conversion, normalization and marshalling of data between different platforms. Remote server 210 may also support networking between different platforms. In addition, remote server 210 may include instructions in a memory for execution by a processor that supports the generation and transmission of notification and content to first user device 202 and second user device 206.

A third user device 214 may be the same or similar as first user device 202. Third user device 214 may enable a recipient to create a wish list, distribute the wish list to intended recipients, such as to a user of second user device 206, and communicate information between devices on network 204, such as through server 210 of a service provider.

When the content, such as a program, is displayed on second user device 206, a user may interact with the content displayed on second user device 206 using first user device 202, the user's finger (with a touch-screen display), or a controller 216 capable of controlling second user device 206 or interne appliance 208. Controller 216 may be a remote control or a joystick or other suitable device. In one embodiment, first user device 202 may include instructions stored in its memory that, when executed by its processor, allows first user device 202 to act as controller 216. Such instructions may be a separate remote control application, part of the instructions executing on a processor of first user device 202, or part of the instructions executing on remote server 210 that allows direct communication between first user device 202 and second user device 206. For example, a user can use controller 216 or first device 202 to browse content, accept a wish list request, select content for purchase, or receive notifications. Control of the content may be passed between first user device 202 and controller 216 of second user device 206 via commands issued at first user device 202 or controller 216. In one embodiment, notifications and updates may be displayed at second user device 206 while viewing content.

In one embodiment, form fields requesting information from the user may be displayed on either first user device 202 or second user device 206, or both, wherein a user can complete the form fields on either device. Examples of form fields include login and password information, search boxes, etc. In one embodiment, a user can be filling in a form field displayed on second device 106 by entering the information on first device 102. Alternatively, for additional privacy, the form fields could only be displayed on first user device 206 for entry on first user device 206. Upon completion of the form fields, the information can be transmitted to network 204 (e.g., the cloud). In some embodiments, a user can enter information into a form field displayed on second user device 206 using controller 216, and the entered information can be transmitted to, and displayed on, first user device 202, or vice versa. Similar functionality can exist on third user device 214 to perform the functions described herein for creating and distributing a wish list.

While viewing content on second user device 206, a user may enter a command at either first user device 202 or second user device 206 using controller 216 to accept a wish list, view a wish list, select an item related to the content, and purchase the item from second user device 206 or first user device 202.

Figure 3A:
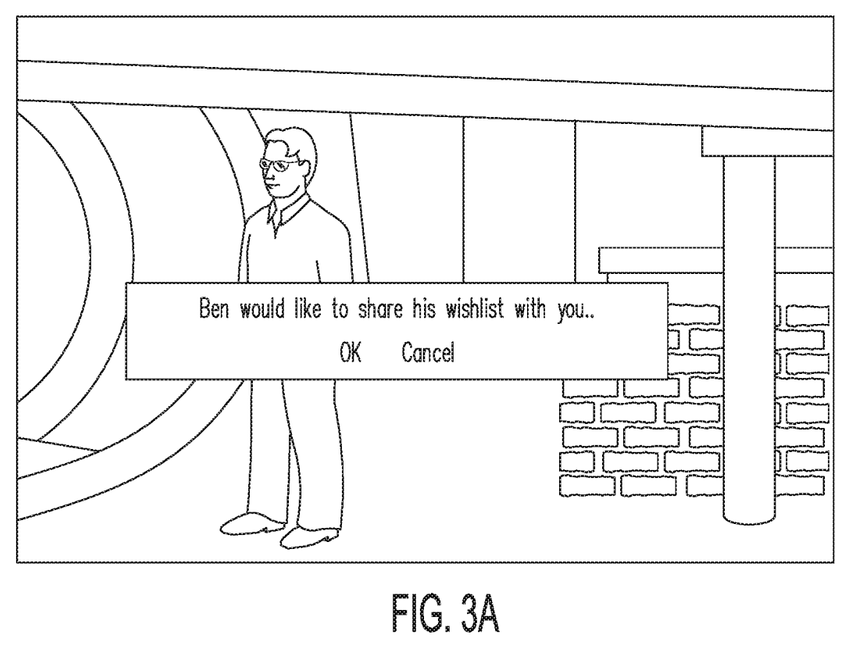
FIGS. 3A and 3B are exemplary device displays a user may see as part of a wish list transaction.
Figure 3B:
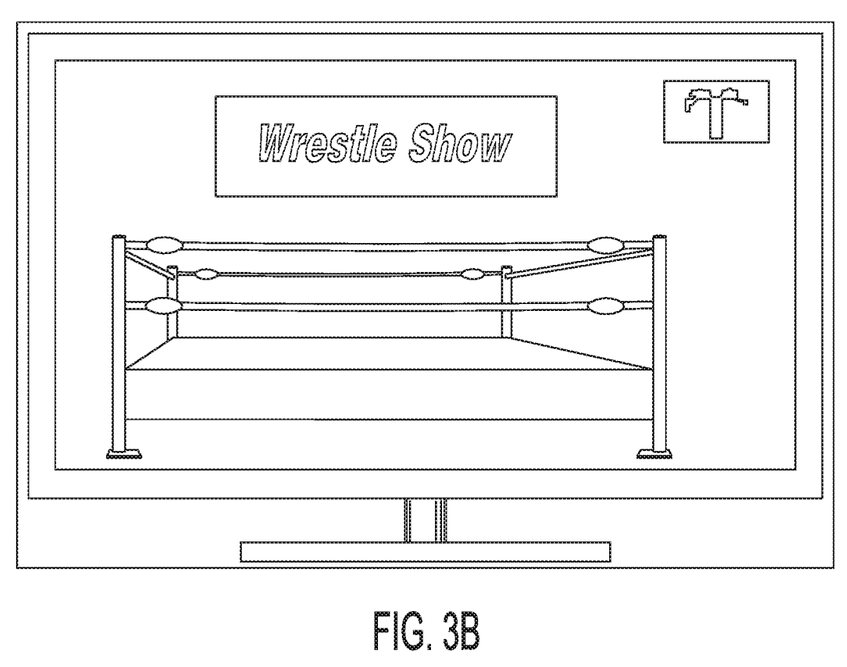

FIGS. 3A and 3B are exemplary device displays a user may see as part of a wish list transaction. FIG. 3A, which may be seen on a television, PC, computing tablet, or smart phone, shows a recipient watching content and having a message appear asking whether the recipient would like to accept a wish list from a user (Ben). The recipient may then select "OK" or "Cancel" to accept or decline the request.

FIG. 3B shows what a recipient may see when an alert is sent by the service provider. The alert, shown here as a picture of a gift on the corner of the display, may pop up on a content screen about a WWE event, where the gift associated with the content is a John Cena t-shirt. The display be on a television, PC, computing tablet, or smart phone, and the content may be a program, an advertisement on a WWE web site, or other electronic content. The recipient may select the alert to purchase a wish list item or obtain additional information about the wish list item.

Figure 4:
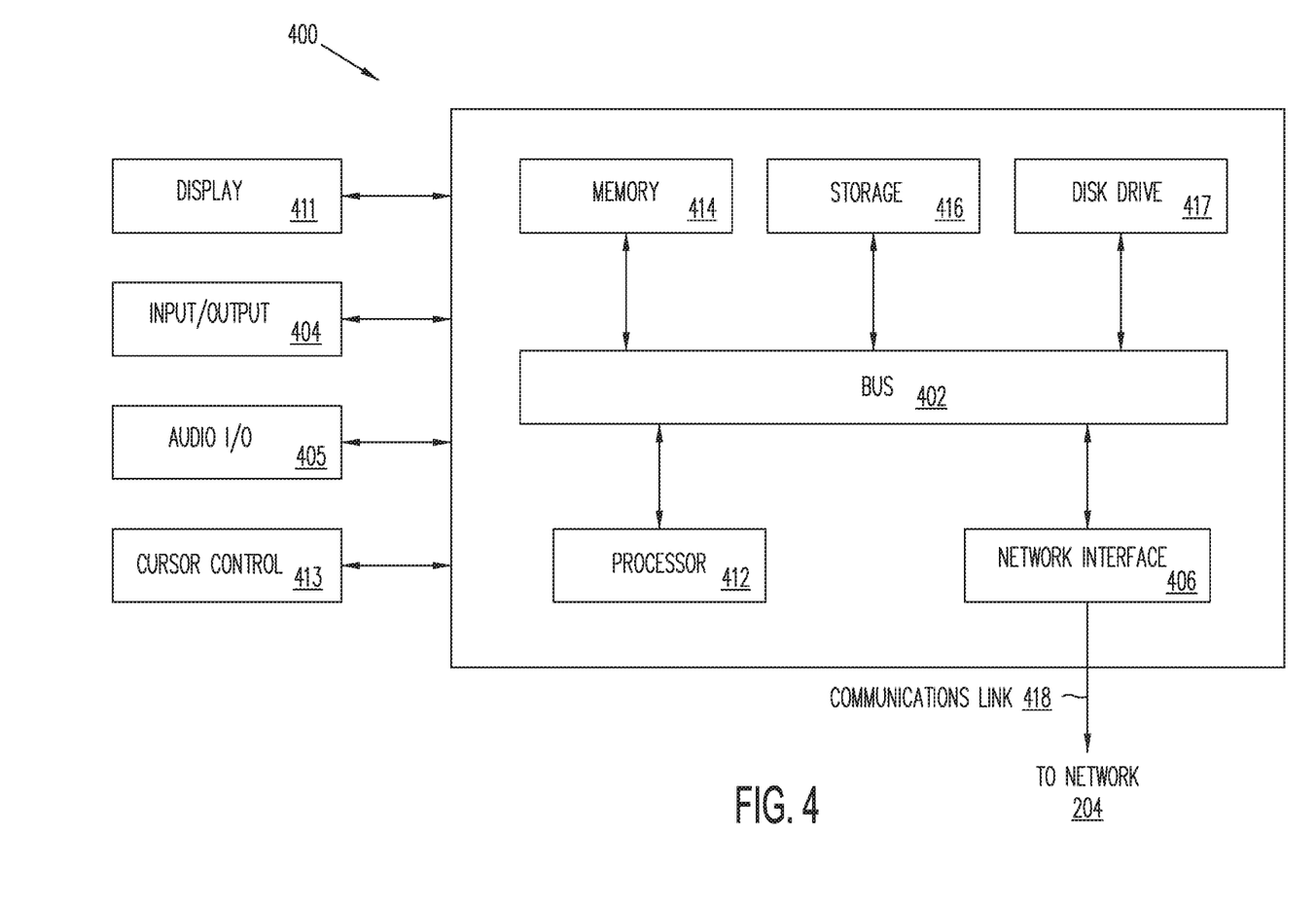
FIG. 4 is a block diagram of a computer system suitable for implementing one or more components in FIG. 2 according to one embodiment of the present disclosure.

FIG. 4 is a block diagram of a computer system 400 suitable for implementing one or more embodiments of the present disclosure. In various implementations, the user device may comprise a personal computing device (e.g., a personal computer, laptop, smart phone, tablet, PDA, Bluetooth device, key FOB, badge, etc.) capable of communicating with the network. Generally, computer system 400 may also be a smart television. The merchant and/or payment provider may utilize a network computing device (e.g., a network server) capable of communicating with the network. It should be appreciated that each of the devices utilized by users, merchants, and payment providers may be implemented as computer system 400 in a manner as follows or modified as needed.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 (e.g., television screen, smart phone touch screen, PC display, etc.) and a cursor control 413 (such as a keyboard, keypad, mouse, remote control, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 460. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more machine readable mediums, including non-transitory machine readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments described herein are exemplary only. One skilled in the art may recognize various alternative embodiments from those specifically disclosed. Those alternative embodiments are also intended to be within the scope of this disclosure. As such, the embodiments are limited only by the following claims.

What is claimed is:

1. A system, comprising:
one or more processors, one or more computer-readable memories, with program instructions stored on the one or more computer-readable memories, the one or more processors configured to execute the program instructions to cause the system to perform the operations comprising:
receiving a wish list including one or more items for a first user provided by a second user using an application that interacts with a first device of the first user and one or more Internet of Things (IoT) devices separate from the first device;
determining that the first user has accepted the wish list using a first selectable option presented via one of an interface of the first device or the one or more IoT devices;
determining content provided by the first device to the first user;
determining that the first device is outputting or has outputted a presentation associated with a first item on the wish list, wherein the determining includes identifying that a first portion of the content corresponds to the first item on the wish list;
determining, based on a content search and a number of positive determinations from the content search for the first item, that the content is related to the presentation of the first item;
providing, to the first user via the one or more IoT devices, a second selectable option corresponding to a purchase of the first item;
detecting, via the one or more IoT devices, a selection of the second selectable option, wherein the selection comprises an acceptance of a purchase of the item and an identification of a first account corresponding to the application and the first user to purchase the first item for the purchase of the item; and
completing a purchase of the first item based on the selection detected via the one or more IoT devices, wherein completing the purchase of the first item further includes using the first account.

2. The system of claim 1, wherein the first user and the second user are connected users on the application, and wherein the determining the content provided by the first device to the first user comprises one of monitoring the content while being provided on the first device or reviewing viewed content data including the content that was previously provided on the first device.

3. The system of claim 1, the operations further comprising in response to the completing the purchase of the first item, removing the first item from the wish list.

4. The system of claim 1, wherein the second selectable option corresponding to the purchase of the first item is provided to the first user via an interface of the one or more IoT devices, and wherein the interface further provides information associated with the wish list to the first user.

5. The system of claim 1, the operations further comprising:
determining that the wish list was transmitted to a third user of the application; and
in response to the determining that the wish list was transmitted to the third user of the application and in response to the completing the purchase of the first item, removing the first item from the wish list transmitted to the third user.

6. The system of claim 1, the operations further comprising in response to the completing the purchase of the first item, providing, to the second user via an interface of the application on a second device of the second user, information indicating that the first item has been purchased.

7. The system of claim 1, wherein the first device is a smartphone or a smart television.

8. A method comprising:
receiving a wish list including one or more items for a first user provided by a second user using an application that interacts with a first device of the first user and one or more Internet of Things (IoT) devices separate from the first device;
determining that the first user has accepted the wish list using a first selectable option presented via one of an interface of the first device or the one or more IoT devices;
determining content provided by the first device to the first user;
determining that the first device is outputting or has outputted a presentation associated with a first item on the wish list, wherein the determining includes identifying that a first portion of the content corresponds to the first item on the wish list;
determining, based on a content search and a number of positive determinations from the content search for the first item, that the content is related to the presentation of the first item;
providing, to the first user via the one or more IoT devices, a second selectable option corresponding to a purchase of the first item;
detecting, via the one or more IoT devices, a selection of the second selectable option, wherein the selection comprises an acceptance of a purchase of the item and an identification of a first account corresponding to the application and the first user to purchase the first item for the purchase of the item; and
completing a purchase of the first item based on the selection detected via the one or more IoT devices, wherein completing the purchase of the first item further includes using a first account corresponding to the application and the first user to purchase the first item.

9. The method of claim 8, wherein the first user and the second user are connected users on the application, and wherein the determining the content provided by the first device to the first user comprises one of monitoring the content while being provided on the first device or reviewing viewed content data including the content that was previously provided on the first device.

10. The method of claim 8, further comprising in response to the completing the purchase of the first item, removing the first item from the wish list.

11. The method of claim 8, wherein the second selectable option corresponding to the purchase of the first item is provided to the first user via an interface of the one or more IoT devices, and wherein the interface further provides information associated with the wish list to the first user.

12. The method of claim 8, further comprising:
determining that the wish list was transmitted to a third user of the application; and
in response to the determining that the wish list was transmitted to the third user of the application and in response to the completing the purchase of the first item, removing the first item from the wish list transmitted to the third user.

13. The method of claim 8, further comprising in response to the completing the purchase of the first item, providing, to the second user via an interface of the application on a second device of the second user, information indicating that the first item has been purchased.

14. The method of claim 8, wherein the first device is a smartphone or a smart television.

15. A computer program product comprising:
one or more computer-readable tangible storage devices, and program instructions stored on at least one of the one or more computer-readable tangible storage devices, the program instructions when executed cause a machine to perform operations comprising:
receiving a wish list including one or more items for a first user provided by a second user using an application that interacts with a first device of the first user and one or more Internet of Things (IoT) devices separate from the first device;
determining that the first user has accepted the wish list using a first selectable option presented via one of an interface of the first device or the one or more IoT devices;
determining content provided by the first device to the first user;
determining that the first device is outputting or has outputted a presentation associated with a first item on the wish list, wherein the determining includes identifying that a first portion of the content corresponds to the first item on the wish list;
determining, based on a content search and a number of positive determinations from the content search for the first item, that the content is related to the presentation of the first item;
providing, to the first user via the one or more IoT devices, a second selectable option corresponding to a purchase of the first item;
detecting, via the one or more IoT devices, a selection of the second selectable option, wherein the selection comprises an acceptance of a purchase of the item and an identification of a first account corresponding to the application and the first user to purchase the first item for the purchase of the item; and
completing a purchase of the first item based on the selection detected via the one or more IoT devices, wherein completing the purchase of the first item further includes using a first account corresponding to the application and the first user to purchase the first item.

16. The computer program product of claim 15, wherein the first user and the second user are connected users on the application, and wherein the determining the content provided by the first device to the first user comprises one of monitoring the content while being provided on the first device or reviewing viewed content data including the content that was previously provided on the first device.

17. The computer program product of claim 15, the operations further comprising in response to the completing the purchase of the first item, removing the first item from the wish list.

18. The computer program product of claim 15, wherein the second selectable option corresponding to the purchase of the first item is provided to the first user via an interface of the one or more IoT devices, and wherein the interface further provides information associated with the wish list to the first user.

19. The computer program product of claim 15, the operations further comprising:
determining that the wish list was transmitted to a third user of the application; and
in response to the determining that the wish list was transmitted to the third user of the application and in response to the completing the purchase of the first item, removing the first item from the wish list transmitted to the third user.

20. The computer program product of claim 15, the operations further comprising in response to the completing the purchase of the first item, providing, to the second user via an interface of the application on a second device of the second user, information indicating that the first item has been purchased.

* * * * *